US007926288B2

(12) United States Patent
Yokota et al.

(10) Patent No.: US 7,926,288 B2
(45) Date of Patent: Apr. 19, 2011

(54) REFORMED-FUEL-BURNING GAS TURBINE SYSTEM AND METHOD OF OPERATING THE SAME

(75) Inventors: Osami Yokota, Hitachinaka (JP); Shinichi Inage, Hitachi (JP); Koji Nishida, Hitachiohta (JP); Akinori Hayashi, Hitachinaka (JP); Hirokazu Takahashi, Hitachinaka (JP); Shinsuke Kokubo, Hitachinaka (JP)

(73) Assignees: Hitachi, Ltd., Tokyo (JP); Petroleum Energy Center, Tokyo (JP)

( * ) Notice: Subject to any disclaimer, the term of this patent is extended or adjusted under 35 U.S.C. 154(b) by 984 days.

(21) Appl. No.: 11/760,144

(22) Filed: Jun. 8, 2007

(65) Prior Publication Data

US 2007/0283701 A1    Dec. 13, 2007

(30) Foreign Application Priority Data

Jun. 9, 2006   (JP) ................. 2006-160778

(51) Int. Cl.
*F02C 3/20* (2006.01)
(52) U.S. Cl. ............ 60/780; 60/39.12; 60/39.281
(58) Field of Classification Search ........ 60/780, 60/39.12, 39.281
See application file for complete search history.

(56) References Cited

U.S. PATENT DOCUMENTS

| 2,720,624 | A | | 10/1955 | Gunst et al. |
| 4,508,127 | A | * | 4/1985 | Thurston .................. 137/8 |
| 2005/0040081 | A1 | * | 2/2005 | Takahashi et al. ....... 208/251 R |
| 2006/0057059 | A1 | * | 3/2006 | Nishida et al. .......... 423/648.1 |
| 2006/0185368 | A1 | * | 8/2006 | Takahashi et al. ........ 60/772 |
| 2007/0113625 | A1 | * | 5/2007 | Sasanuma et al. ........ 73/61.46 |
| 2007/0189909 | A1 | * | 8/2007 | Youn ..................... 417/248 |
| 2010/0005783 | A1 | * | 1/2010 | Keppeler et al. .......... 60/277 |

FOREIGN PATENT DOCUMENTS

EP    1 624 041 A1    2/2006
JP    2002-338973 A    11/2002

OTHER PUBLICATIONS

European Search Report dated Jun. 24, 2010 (Six (6) pages).

* cited by examiner

*Primary Examiner* — Michael Cuff
*Assistant Examiner* — Vikansha S Dwivedi
(74) *Attorney, Agent, or Firm* — Crowell & Moring LLP (57) ABSTRACT

The present invention provides a reformed-fuel-burning gas turbine system that constantly generates good-quality reformed fuel even when heavy fuel has a different composition.
The reformed-fuel-burning gas turbine system according to the present invention comprises a heavy oil heater; a water heater; a reformer vessel for mixing high-temperature, high-pressure water with high-temperature, high-pressure heavy oil to cause a hydrothermal reaction and producing reformed fuel from heavy oil; and a gas turbine which operates on the reformed fuel. The reformed-fuel-burning gas turbine system according to the present invention further comprises a detector for detecting the static dielectric constants or solubility of high-temperature, high-pressure heavy oil heated by the heavy oil heater and high-temperature, high-pressure water heated by the water heater; a first temperature regulating valve for adjusting the thermal dose of the heavy oil heater; a second temperature regulating valve for adjusting the thermal dose of the water heater; and a control device for adjusting the first temperature regulating valve and the second temperature regulating valve in accordance with the static dielectric constants or solubility of the heavy oil and water, which are detected by the detector, in order to control the static dielectric constants or solubility of the high-temperature, high-pressure heavy oil and high-temperature, high-pressure water, which are to be supplied to the reformer vessel.

14 Claims, 5 Drawing Sheets

FIG. 6

REFORMED-FUEL-BURNING GAS TURBINE SYSTEM AND METHOD OF OPERATING THE SAME

BACKGROUND OF THE INVENTION

1. Field of the Invention

The present invention relates to a reformed-fuel-burning gas turbine system operating on reformed fuel derived from heavy oil, and to a method of operating the reformed-fuel-burning gas turbine system.

2. Description of the Related Art

Heavy oil is less expensive than LNG and light oil as fuels for a gas turbine. However, the heavy oil is not suitable as a fuel for the gas turbine because it has a high viscosity and high contents of sulfur and heavy metals.

To effectively use the inexpensive heavy oil as a fuel, efforts are being made to study and develop various methods of reforming the heavy oil by lightening, desulfurizing, and demetallizing of the heavy oil so as to be applicable to the gas turbine.

A technique about a fuel reforming system is disclosed in JP-A-2002-338973. With the disclosed technique, heavy oil is reacted with water under a high-pressure, high-temperature condition of about 25 MPa, 380° C., and is thermally decomposed and hydrolyzed. Then, reformed fuel is generated from the heavy oil, and is supplied as a gas turbine fuel.

SUMMARY OF THE INVENTION

In the fuel reforming system disclosed by JP-A-2002-338973, to produce good-quality reformed fuel from the heavy oil by subjecting the heavy oil to hydrothermal reaction, it is necessary to establish a high-temperature, high-pressure condition that is ideal for reforming the heavy oil.

The composition of the heavy oil used for reformed fuel generation varies with the crude oil production region and the petroleum producer's mixing method. It is therefore necessary to select heavy oil reforming conditions (temperature and pressure) appropriate for the composition of the heavy oil before producing reformed fuel.

In the case of reforming heavy oil which has a high asphaltene content, if appropriate reforming conditions is not selected, it may incur coking during a reforming process or increase the concentration of tar, which may arise during reforming, and make difficult to achieve ejection, thereby adversely affecting the reforming process.

In the past, however, heavy oil reforming control was not exercised while considering the difference in the composition of the heavy oil. The difference in the composition of the heavy oil constituted an obstacle to the generation of high-quality reformed fuel from the heavy oil.

An object of the present invention is to provide a reformed-fuel-burning gas turbine system and a method of operating the reformed-fuel-burning gas turbine system, which select reforming conditions appropriate for the composition of heavy oil and constantly generate good-quality reformed fuel even when the heavy oil to be reformed has a different composition and a high asphaltene content.

The present invention provides a reformed-fuel-burning gas turbine system comprising a heavy oil heater for heating heavy oil under high pressure, a water heater for heating water under high pressure, a reformer vessel for mixing high-temperature, high-pressure water with high-temperature, high-pressure heavy oil to cause a hydrothermal reaction and producing reformed fuel from heavy oil, and a gas turbine which operates on the reformed fuel produced in the reformer vessel, the reformed-fuel-burning gas turbine system further comprising: a detector for detecting the static dielectric constants or solubility of high-temperature, high-pressure heavy oil heated by the heavy oil heater and high-temperature, high-pressure water heated by the water heater; a first temperature regulating valve, which is provided in a line for supplying a heating medium to the heavy oil heater and used to adjust the thermal dose of the heavy oil heater, and a second temperature regulating valve, which is provided in a line for supplying a heating medium to the water heater and used to adjust the thermal dose of the water heater, or a first pressure regulating valve, which is provided in a line for supplying heavy oil to the heavy oil heater and used to adjust the pressure of the heavy oil, and a second pressure regulating valve, which is provided in a line for supplying water to the water heater and used to adjust the pressure of the water; and a control device for adjusting either the first temperature regulating valve and the second temperature regulating valve or the first pressure regulating valve and the second pressure regulating valve in accordance with the static dielectric constants or solubility of the heavy oil and water, which are detected by the detector, in order to control the static dielectric constants or solubility of the high-temperature, high-pressure heavy oil and high-temperature, high-pressure water to be supplied to the reformer vessel.

The present invention also provides a method of operating a reformed-fuel-burning gas turbine system, the method comprising steps of heating heavy oil under high pressure with a heavy oil heater, heating water under high pressure with a water heater, mixing high-temperature, high-pressure water with high-temperature, high-pressure heavy oil in a reformer vessel to cause a hydrothermal reaction and produce reformed fuel from heavy oil, and driving a gas turbine on the reformed fuel, the method further comprising the steps of: detecting the static dielectric constants or solubility of high-temperature, high-pressure heavy oil heated by the heavy oil heater and high-temperature, high-pressure water heated by the water heater; and adjusting the opening of a first temperature regulating valve, which is provided in a line for supplying a heating medium to the heavy oil heater and used to adjust the thermal dose of the heavy oil heater, and the opening of a second temperature regulating valve, which is provided in a line for supplying a heating medium to the water heater and used to adjust the thermal dose of the water heater, or adjusting the opening of a first pressure regulating valve, which is provided in a line for supplying heavy oil to the heavy oil heater and used to adjust the pressure of the heavy oil, and the opening of a second pressure regulating valve, which is provided in a line for supplying water to the water heater and used to adjust the pressure of the water, in accordance with the detected static dielectric constants or solubility for the purpose of controlling the static dielectric constants or solubility of the high-temperature, high-pressure heavy oil and high-temperature, high-pressure water to be supplied to the reformer vessel.

According to the present invention, it is possible to realize a reformed-fuel-burning gas turbine system and a method of operating the reformed-fuel-burning gas turbine system, which select reforming conditions appropriate for the composition of heavy oil and constantly generate good-quality reformed fuel even when the heavy oil to be reformed has a different composition and a high asphaltene content.

DETAILED DESCRIPTION OF THE PREFERRED EMBODIMENTS

A reformed-fuel-burning gas turbine system according to an embodiment of the present invention will now be described with reference to the accompanying drawings.

First Embodiment

The reformed-fuel-burning gas turbine system according to one embodiment of the present invention will now be described with reference to FIG. 1.

Figure 1:
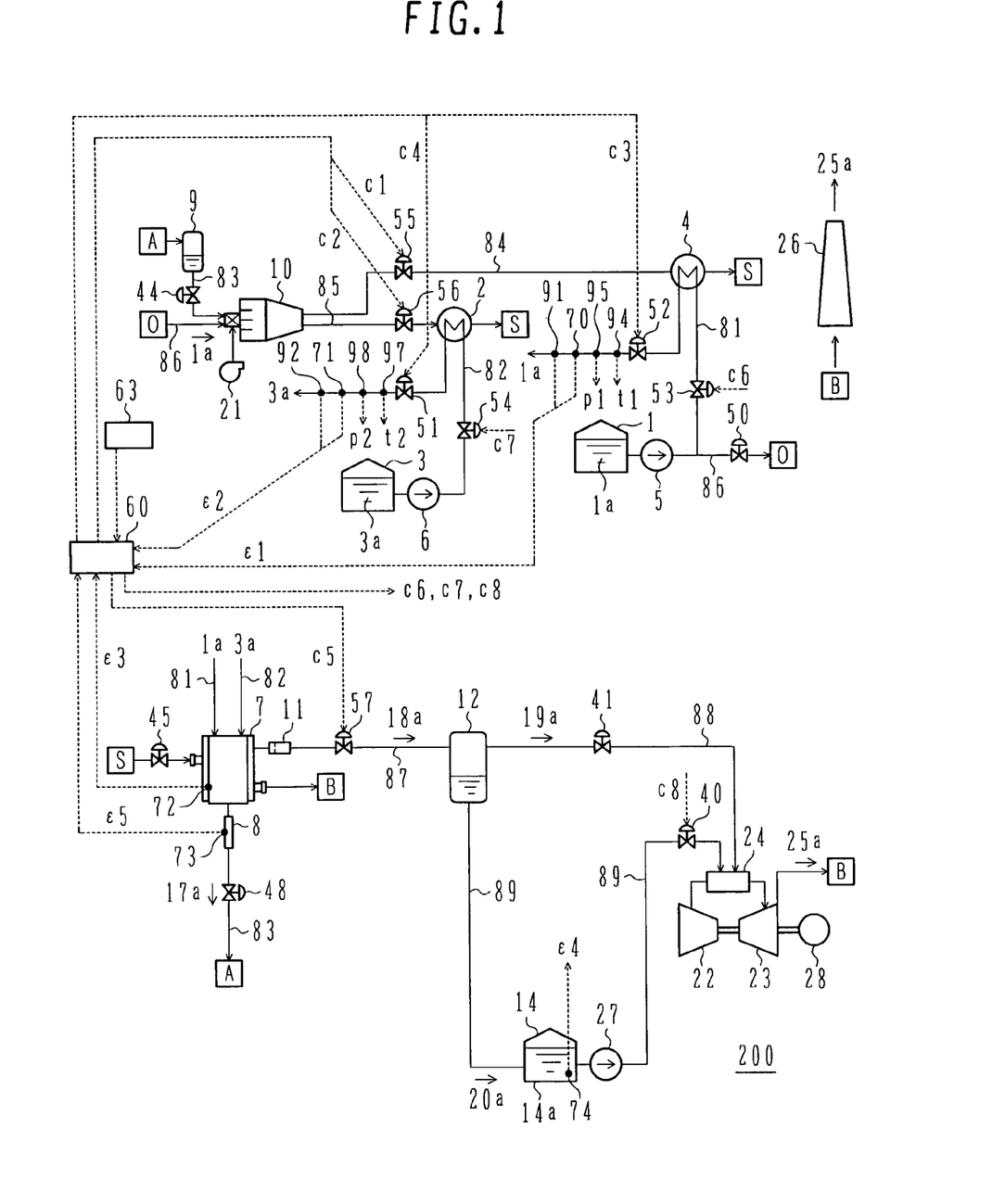
FIG. 1 is a schematic diagram illustrating a reformed-fuel-burning gas turbine system according to one embodiment of the present invention.

The reformed-fuel-burning gas turbine system according to one embodiment of the present invention, which is shown in FIG. 1, includes the equipment for producing good-quality reformed fuel from heavy oil by subjecting the heavy oil to hydrothermal reaction. The equipment includes, as a heavy oil line, a heavy oil tank 1 and a heavy oil heater 4. The heavy oil tank 1 stores heavy oil 1a. The heavy oil heater 4 heats and compresses the heavy oil 1a, which is stored in the heavy oil tank 1 and supplied through a piping 81 by a heavy oil pump 5, until a temperature as high as 200 to 400° C. and a pressure as high as 10 to 30 MPa are reached.

The equipment also includes, as a water line, a pure water tank 3 and a water heater or pure water heater 2. The pure water tank 3 stores high-purity water or pure water 3a. The pure water heater 2 heats and compresses the pure water 3a, which is stored in the pure water tank 3 and supplied through a piping 82 by a pure water pump 6, until a temperature as high as 350 to 500° C. and a pressure as high as 10 to 30 MPa are reached.

Further, the equipment includes a reformer vessel 7. The heavy oil 1a, which is heated and compressed by the heavy oil heater 4 to a temperature as high as 200 to 400° C. and a pressure as high as 10 to 30 MPa, and the pure water 3a, which is heated and compressed by the pure water heater 2 to a temperature as high as 350 to 500° C. and a pressure as high as 10 to 30 MPa, are respectively supplied through pipings 81, 82 to the reformer vessel 7. The reformer vessel 7 mixes the heavy oil 1a with the pure water 3a under the aforementioned high-temperature, high-pressure conditions to cause a hydrothermal reaction, reform the heavy oil, and produce reformed fuel.

The flow rate of the high-temperature, high-pressure heavy oil 1a supplied to the reformer vessel 7 is adjusted by a high-temperature, high-pressure heavy oil supply valve 52 installed in the piping 81. The flow rate of the high-temperature, high-pressure pure water 3a supplied to the reformer vessel 7 is adjusted by a high-temperature, high-pressure water supply valve 51 installed in the piping 82.

Tar 17a, which is residual oil left at the bottom of the reformer vessel 7 as a result of hydrothermal reaction in the reformer vessel 7, is removed from the bottom of the reformer vessel 7 and supplied to a tar tank 9 through a piping 83.

The tar 17a stored in the tar tank 9 is supplied to a tar burner 10 together with air from a blower 21, with the flow rate of the tar 17a adjusted by a tar open/close valve 44 installed in the piping 83. The tar 17a is burned in the tar burner 10 to generate a heating medium, which serves as a heat source.

The heating medium, which is a heat source generated by burning the tar 17a in the tar burner 10, is supplied to the heavy oil heater 4 and pure water heater 2 through pipings 84, 85, and used as the heat source for generating high-temperature, high-pressure heavy oil 1a and pure water 3a.

The flow rate of the heating medium supplied from the tar burner 10 to the heavy oil heater 4 is adjusted by a heavy oil heater temperature regulating valve 55 installed in the piping 84. The flow rate of the heating medium supplied from the tar burner 10 to the pure water heater 2 is adjusted by a pure water heater temperature regulating valve 56 installed in the piping 85.

If the heating medium, which is a heat source generated by burning the tar in the tar burner 10, is insufficient, part of the heavy oil 1a stored in the heavy oil tank 1 is supplied to the tar burner 10 through a piping 86, which branches off from the piping 81, and burned.

A high-temperature, high-pressure reformed fuel 18a produced in the reformer vessel 7 is decompressed by a decompression orifice 11 installed in a piping 87, and supplied to a separator 12 through the piping 87.

The separator 12 separates the reformed fuel 18a into reformed gas 19a and liquid reformed fuel 20a. The liquid reformed fuel 20a is supplied to a reformed oil tank 14 through a piping 89 and stored.

The liquid reformed fuel 20a stored in the reformed oil tank 14 is compressed by a reformed fuel pump 27 installed in a piping 89, supplied to a combustor 24 through the piping 89, and burned as a fuel. Further, a reformed oil supply valve 40 is installed in the piping 89. This valve is used to adjust the flow rate of the liquid reformed fuel 20a to be supplied to the combustor 24.

Meanwhile, the reformed gas 19a, which is generated in the separator 12, is also supplied to the combustor 24 through a piping 88 and burned as a fuel as is the case with the liquid reformed fuel 20a. A reformed gas supply valve 41 is installed in the piping 88. This valve is used to adjust the flow rate of the reformed gas 19a to be supplied to the combustor 24.

The reformed-fuel-burning gas turbine system includes a gas turbine installation 200 for generating electrical power by burning the good-quality reformed fuel 18a that is generated by subjecting the high-temperature, high-pressure heavy oil 1a and pure water 3a to hydrothermal reaction in the reformer vessel 7. The gas turbine installation 200 includes an air compressor 22 for compressing air, a combustor 24 for generating a combustion gas 25a by burning the air compressed by the air compressor 22 and the reformed fuel 18a, a turbine 23 that is driven by the combustion gas 25a generated by the combustor 24, a power generator 28 that is the load to be driven by the turbine 23, and an exhaust pipe 26 for exhausting the combustion gas 25a, which flows downward in the turbine 23, to the atmosphere.

The reformed-fuel-burning gas turbine system also includes a control device 60. The control device 60 controls the opening of the heavy oil heater temperature regulating valve 55, which is installed in the piping 84 for supplying the heating medium for the heavy oil heater 4 from the tar burner 10, and the opening of the pure water heater temperature regulating valve 56, which is installed in the piping 85 for supplying the heating medium for the pure water heater 2 from the tar burner 10.

In the piping 81 downstream of the heavy oil heater 4 for heating the heavy oil 1a under high pressure, a heavy oil measurement capacitance sensor 70 for measuring the static dielectric constant $\in 1$ of the heavy oil 1a flowing in the piping 81 is provided. In the piping 82 downstream of the pure water heater 2 for heating the pure water 3a under high pressure, a pure water measurement capacitance sensor 71 for measuring the static dielectric constant $\in 2$ of the pure water 3a flowing in the piping 82 is provided.

The static dielectric constants of the heavy oil 1a and pure water 3a, which are detected by the heavy oil measurement capacitance sensor 70 and pure water measurement capacitance sensor 71, are given to the control device 60 as input data.

In the piping 81 downstream of the heavy oil heater 4 for heating the heavy oil 1a under high pressure, The heavy oil measurement capacitance sensor 70 may be replaced with a heavy oil measurement solubility sensor 91 for measuring the solubility of the heavy oil 1a flowing in the piping 81. In the piping 82 downstream of the pure water heater 2 for heating the pure water 3a under high pressure, The pure water measurement capacitance sensor 71 may be replaced with a pure water measurement solubility sensor 92 for measuring the solubility of the pure water 3a flowing in the piping 82. FIG. 1 shows the example that the heavy oil measurement capacitance sensor 70, the pure water measurement capacitance sensor 71, the heavy oil measurement solubility sensor 91, and the pure water measurement solubility sensor 92 are installed.

The static dielectric constants $\in 1$, $\in 2$ or the solubility of the heavy oil 1a and pure water 3a, which are detected by the heavy oil measurement capacitance sensor 70 and pure water measurement capacitance sensor 71 or the heavy oil measurement solubility sensor 91 and pure water measurement solubility sensor 92, are given to the control device 60 as input data.

A reformed fuel measurement capacitance sensor 72 for detecting the status of the reformed fuel 18a generated in the reformer vessel 7 is installed in the reformer vessel 7. A tar measurement capacitance sensor 73 for detecting the status of the tar 17a is installed in a tar pipe 8, which is provided for the piping 83 for removing the tar 17a remained in the reformer vessel 7.

The static dielectric constants $\in 3$, $\in 5$ of the reformed fuel 18a and tar 17a, which are detected by the reformed fuel measurement capacitance sensor 72 and tar measurement capacitance sensor 73, are also given to the control device 60 as input data.

Figure 6:
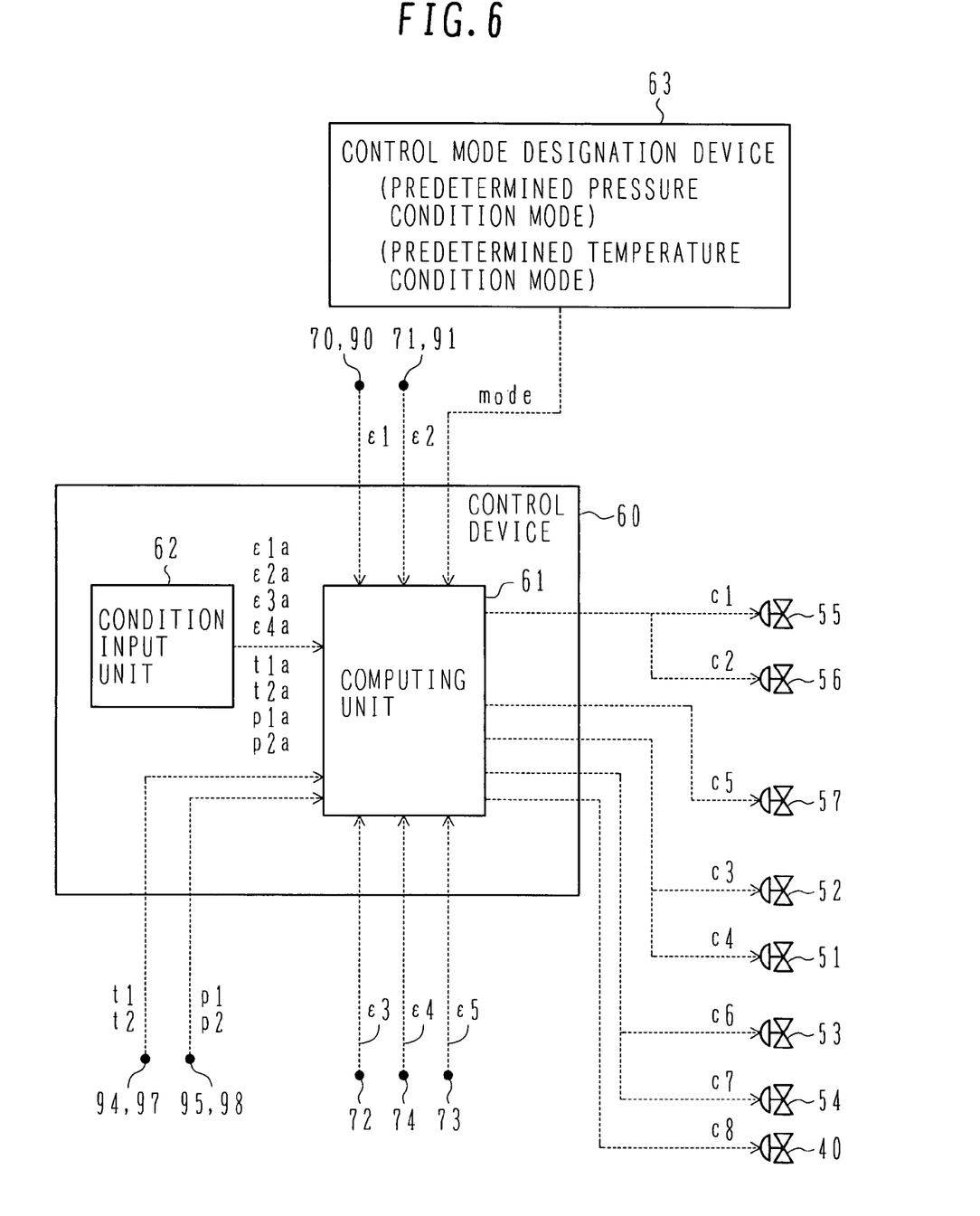
FIG. 6 is a control block diagram illustrating a control device in the reformed-fuel-burning gas turbine system according to the embodiment shown in FIG. 1.

As shown in FIG. 6, the control device 60 inputs an instruction signal from a control mode designation device 63, which selects a control mode to be exercised by a computing unit 61 of the control device 60 in either a predetermined pressure condition mode or a predetermined temperature condition mode.

The heavy oil 1a is heated by the heavy oil heater 4 to a high temperature under high pressure and flows downward through the piping 81. A pressure gauge 95 and a thermometer 94, which are installed in the piping 81, detect a pressure signal p1 and a temperature signal t1 of the heavy oil 1a. The detected pressure signal p1 and temperature signal t1 are inputted to the computing unit 61 of the control device 60.

Similarly, the pure water 3a is heated by the pure water heater 2 to a high temperature under high pressure and flows downward through the piping 82. A pressure gauge 98 and a thermometer 97, which are installed in the piping 82, detect a pressure signal p2 and a temperature signal t2 of the pure water 3a. The detected pressure signal p2 and temperature signal t2 are inputted to the computing unit 61.

The control device 60 includes the computing unit 61 and a condition input unit 62. The computing unit 61 calculates valve opening instruction signals c1-c7 and outputs them to various adjustment valves 51-57 in accordance with a control mode instruction signal, which is selected by the control mode designation device 63, and the detected static dielectric constants $\in 1$, $\in 2$, $\in 3$, $\in 5$ of the heavy oil 1a, pure water 3a, reformed fuel 18a, and tar 17a. The condition input unit 62 sets the static dielectric constant condition values $\in 1a$, $\in 2a$, $\in 3a$ of the heavy oil 1a, pure water 3a, and reformed fuel 18a, and inputs them into the computing unit 61.

Supply quantity control over the heavy oil 1a and pure water 3a to be supplied to the reformer vessel 7 will now be described with reference to control flowcharts in FIGS. 4 and 5. In a process 52a for supplying the heavy oil and pure water to the reformer vessel, the quantities of the heavy oil 1a and pure water 3a to be supplied to the reformer vessel 7 for generating the reformed fuel 18a through a hydrothermal reaction at a high temperature under high pressure are adjusted by the high-temperature, high-pressure heavy oil supply valve 52, which is installed in the piping 81, and the high-temperature, high-pressure water supply valve 51, which is installed in the piping 82. The openings of the high-temperature, high-pressure heavy oil supply valve 52 and high-temperature, high-pressure water supply valve 51 are controlled in accordance with the valve opening instruction signals c3, c4 calculated by the computing unit 61.

Pressure control over the high-temperature, high-pressure heavy oil 1a to be supplied to the reformer vessel 7 will now be described. In a process 53a for exercising pressure regulating valve control, which is shown in the control flowcharts, the pressure of the heavy oil 1a is adjusted by a heavy oil pressure regulating valve 53, which is installed in the piping 81 downstream of the heavy oil pump 5.

Temperature control over the high-temperature, high-pressure heavy oil 1a will now be described. In a process 55a for exercising temperature regulating valve control, the temperature of the heavy oil 1a is adjusted by the heavy oil heater temperature regulating valve 55, which is installed in the piping 84 for introducing the heating medium, which is a heat source generated by burning the tar in the tar burner 10, into the heavy oil heater 4.

The computing unit 61 compares the pressure signal p1 and temperature signal t1 of the heavy oil 1a, which are detected by the pressure gauge 95 and thermometer 94 installed in the piping 81, against a pressure setting p1a and temperature setting t1a for the heavy oil 1a set by the condition input unit 62. Then, the computing unit 61 controls the pressure p1 and temperature t1 of the high-temperature, high-pressure heavy oil 1a by adjusting the openings of the heavy oil pressure regulating valve 53 and heavy oil heater temperature regulating valve 55 in accordance with the valve opening instruction signals c6, c1, which are calculated by the computing unit 61, so that the actual pressure signal p1 and temperature signal t1 agree with the pressure setting p1a and temperature setting t1a, respectively.

Similarly, the pressure of the high-temperature, high-pressure pure water 3a to be supplied to the reformer vessel 7 is adjusted in a temperature regulating valve control process 54a shown in the control flowcharts. More specifically, this adjustment is made by operating a pure water pressure regulating valve 54, which is installed in the piping 82 downstream of the pure water pump 6.

The temperature of the high-temperature, high-pressure pure water 3a is adjusted in a temperature regulating valve control process 56a. More specifically, this adjustment is made by operating the pure water heater temperature regulating valve 56, which is installed in the piping 85 for introducing the heating medium, which is a heat source generated by burning the tar in the tar burner 10, into the pure water heater 2.

The computing unit 61 compares the pressure signal p2 and temperature signal t2 of the pure water 3a, which are detected by the pressure gauge 98 and thermometer 97 installed in the piping 82, against a pressure setting p2a and temperature setting t2a for the pure water 3a set by the condition input unit 62. Then, the computing unit 61 controls the pressure p2 and temperature t2 of the high-temperature, high-pressure pure water 3a by adjusting the openings of the pure water pressure regulating valve 54 and pure water heater temperature regulating valve 56 in accordance with the valve opening instruction signals c7, c2, which are calculated by the computing unit 61, so that the actual pressure signal p2 and temperature signal t2 agree with the pressure setting p2a and temperature setting t2a, respectively.

A method of operating the reformed-fuel-burning gas turbine system having the control device 60, which is configured as described above, will now be described.

The method of mixing the heavy oil 1a and pure water 3a at a high temperature under high pressure to cause a hydrothermal reaction, reform the heavy oil 1a, and generate the reformed fuel 18a is described below with reference to FIGS. 1 and 6. The heavy oil heater 4 heats and compresses the heavy oil 1a until a temperature as high as 200 to 400° C. and a pressure as high as 10 to 30 MPa are reached. The pure water heater 2 heats and compresses the pure water 3a until a temperature as high as 350 to 500° C. and a pressure as high as 10 to 30 MPa are reached. The high-temperature, high-pressure heavy oil supply valve 52 installed in the piping 81 and the high-temperature, high-pressure water supply valve 51 installed in the piping 82 adjust the flow rates of the heavy oil 1a and pure water 3a, and supply them to the reformer vessel 7.

The reformer vessel 7 mixes the high-temperature, high-pressure heavy oil 1a with the high-temperature, high-pressure pure water 3a to cause a hydrothermal reaction, lightens the heavy oil 1a, and produce the reformed fuel 18a.

The tar pipe 8 provided for the piping 83 is used to remove the tar 17a, which is residual oil that is left at the bottom of the reformer vessel 7 at the time of reformed fuel production.

The removed tar 17a is supplied to the tar tank 9 through the piping 83. The tar 17a is then forwarded from the tar tank 9 to the tar burner 10, which uses the tar 17a as a main fuel. The tar burner 10 burns the supplied tar 17a together with the air supplied from the blower 21 to generate the heating medium, which serves as a heat source.

The flow rate of the heating medium, which is generated by burning the tar 17a in the tar burner 10 and supplied to the heavy oil heater 4 for heating purposes, is controlled by the valve opening instruction signal c1 from the control device 60 in relation to the heavy oil heater temperature regulating valve 55 installed in the piping 84, to adjust the heating temperature for the heavy oil 1a heated by the heavy oil heater 4.

Similarly, the flow rate of the heating medium, which is supplied to the pure water heater 2 for heating purposes, is controlled by the valve opening instruction signal c2 from the control device 60 in relation to the pure water heater temperature regulating valve 56 installed in the piping 85, to adjust the heating temperature for the pure water 3a heated by the pure water heater 2.

The reformed fuel 18a produced by lightening the heavy oil 1a through a hydrothermal reaction in the reformer vessel 7 is high temperature and high pressure. Therefore, the reformed fuel 18a is decompressed by the decompression orifice 11 installed in the piping 87, and supplied to the separator 12 through the piping 87.

The separator 12 separates the reformed fuel 18a into the reformed gas 19a and the liquid reformed fuel 20a. The resulting liquid reformed fuel 20a is supplied to the reformed oil tank 14 through the piping 89 and stored.

The liquid reformed fuel 20a stored in the reformed oil tank 14 is compressed by the reformed fuel pump 27, supplied to the combustor 24 in the gas turbine installation 200 through the piping 89, and burned as a fuel.

Meanwhile, the reformed gas 19a, which is generated in the separator 12, is also supplied to the combustor 24 in the gas turbine installation 200 through the piping 88 and burned together with the liquid reformed fuel 20a as a fuel.

In the gas turbine installation 200, the compressed air, which is generated by the air compressor 22, and the reformed gas 19a and liquid reformed fuel 20a, which are derived from the reformed fuel 18a, are mixed and burned in the combustor 24. The combustion gas, which is generated as a result of burning, is used to rotate the turbine 23 and drive the power generator 28 for power generation purposes.

The combustion gas flows downward in the turbine 23 and is exhausted, as combustion exhaust gas 25a, to the atmosphere from the exhaust pipe 26 positioned downstream of the turbine 23.

The above description assumes that the heavy oil 1a and pure water 3a are heated by using the heating medium, which is a high-temperature gas obtained by burning the tar 17a in the tar burner 10, as a heat source for the heavy oil heater 4 and pure water heater 2, the tar 17a being residual oil removed from the bottom of the reformer vessel 7. However, no problem occurs even if an electric heater or other heat source is used.

The general relationship between the static dielectric constants and mixing characteristic will now be described. Under normal conditions, water does not uniformly mix with oil at a normal temperature under normal pressure. In most cases, the static dielectric constants of such substances, which do not mix, greatly differ from each other. It is known that the static dielectric constants of substances that properly mix are virtually equal.

The static dielectric constants $\in$ of two substances that do not mix are greatly different from each other. For example, the static dielectric constant $\in$ of water is 80 (at a normal temperature under atmospheric pressure), whereas the static dielectric constant $\in$ of oil ranges from 1.8 to 2.4 (at a normal temperature under atmospheric pressure). Water has about 40 times the static dielectric constant of oil.

Figure 2:
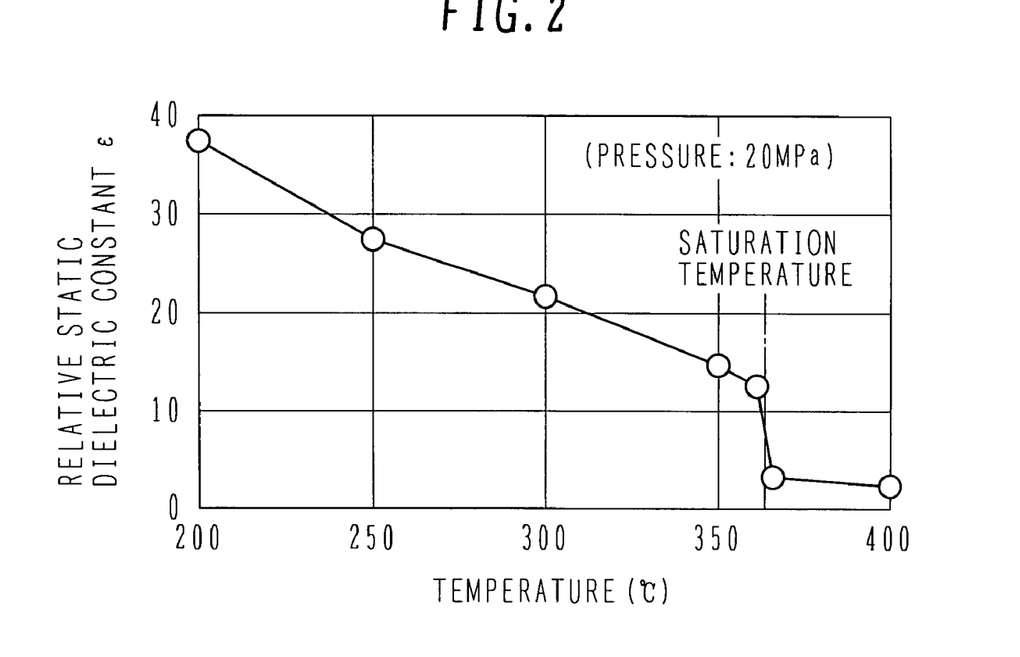
FIG. 2 is a water vapor static dielectric constant characteristic diagram illustrating the relationship between water vapor temperature and static dielectric constant under a predetermined pressure.

FIG. 2 is a characteristic diagram illustrating the relationship between the temperature and static dielectric constant $\in$ of water that is heated under high pressure. The characteristic diagram indicates that the static dielectric constant $\in$ of water extremely decreases when the water is vaporized at a high temperature under high pressure.

As is obvious from the characteristic diagram that is shown in FIG. 2 to depict the relationship between the temperature and static dielectric constant $\in$ of water heated under high pressure (20 MPa), the static dielectric constant $\in$ gradually decreases with an increase in the water temperature and drastically decreases when a saturation temperature is exceeded.

Figure 3:
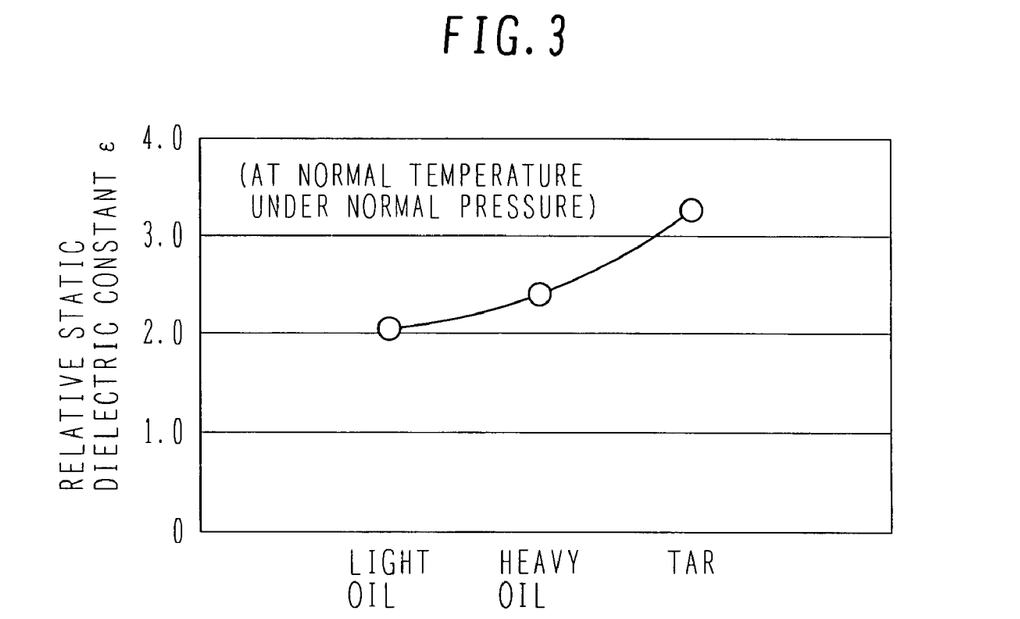
FIG. 3 is an oil static dielectric constant characteristic diagram illustrating the relationship between common types of oils and static dielectric constant at a normal-temperature under normal-pressure.

FIG. 3 shows the static dielectric constant characteristics of certain types of oils that are maintained at a normal temperature under normal pressure. This figure indicates that the static dielectric constants $\in$ of light oil, heavy oil, and extra heavy oil (tar or asphalt) are 1.8 to 2.0, 2.0 to 2.4, and 3.4, respectively.

As is obvious from the static dielectric constant characteristics of certain types of oils shown in FIG. 3, the static dielectric constant tends to increase in accordance with a transition from light oil to heavy oil. The static dielectric constant of oil also varies with temperature and pressure conditions.

A control method employed by the reformed-fuel-burning gas turbine system according to one embodiment of the present invention, which includes the control device shown in FIGS. 1 and 6, will now be described in detail with reference to control flowcharts in FIGS. 4 and 5 together.

The control method for the reformed-fuel-burning gas turbine system in the predetermined pressure condition mode in which the pressure condition is maintained constant will now be described. The reformed-fuel-burning gas turbine system shown in FIG. 1 heats the heavy oil 1a and pure water 3a with the heavy oil heater 3 and pure water heater 2 while subjecting the heavy oil 1a and pure water 3a to a predetermined high pressure, mixes the heavy oil 1a and pure water 3a in the reformer vessel 7 under a predetermined high-pressure, high-temperature condition, and causes a hydrothermal reaction to produce the reformed fuel 18a from the heavy oil 1a.

The composition of the heavy oil 1a varies with the crude oil production region and the petroleum producer's mixing method. Therefore, the reforming conditions (temperature and pressure) for reforming the heavy oil by subjecting the heavy oil 1a and pure water 3a to a hydrothermal reaction in the reformer vessel 7 at a high temperature under high pressure need to be changed to match the composition of the heavy oil 1a before producing the reformed fuel 18a.

Figure 4:
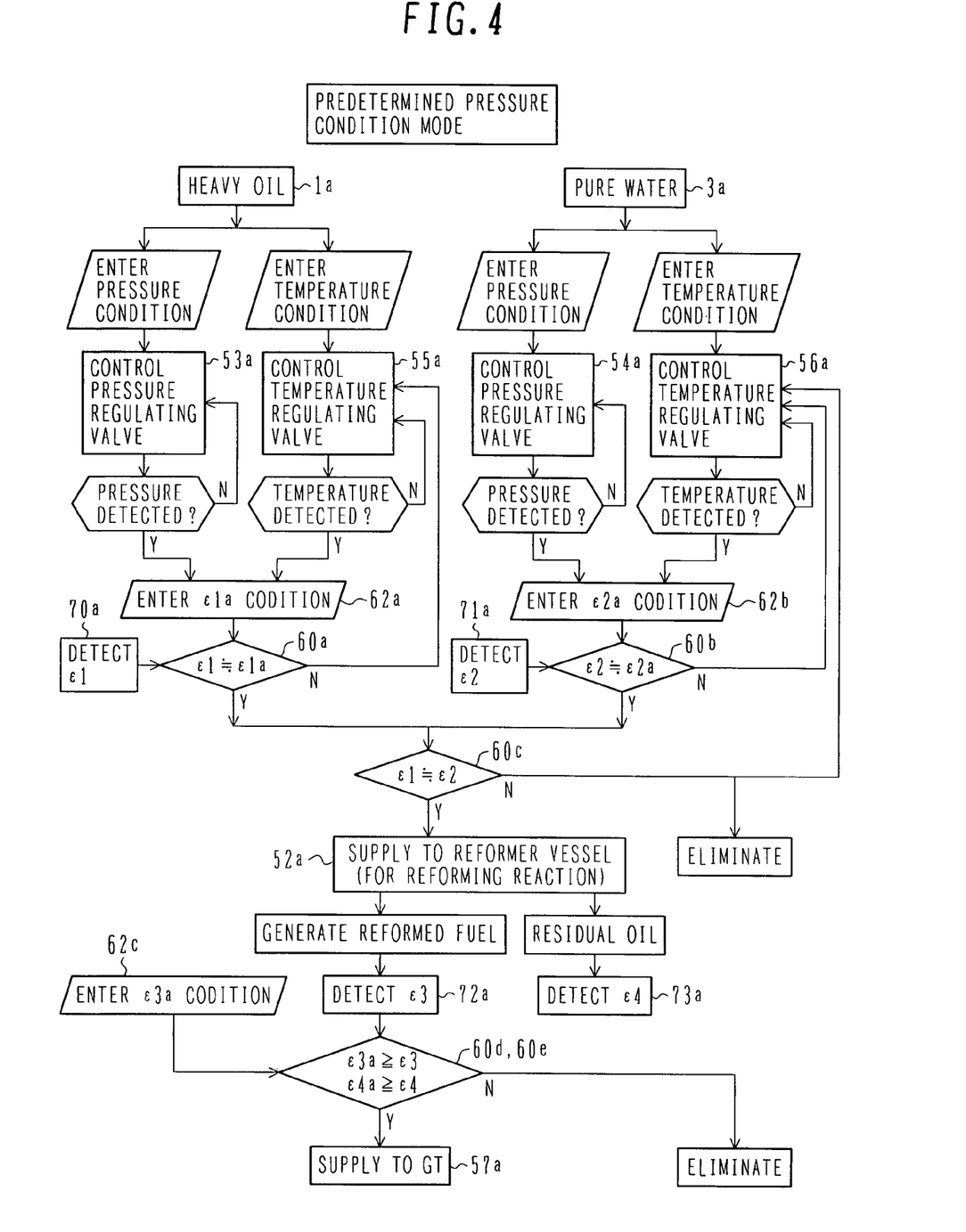
FIG. 4 is a control flowchart illustrating how the reformed-fuel-burning gas turbine system according to the embodiment shown in FIG. 1 exercises control in a predetermined pressure condition mode.

First of all, to adjust the heavy oil 1a, which is heated in the heavy oil heater 4 and placed in a high-temperature, high-pressure state, for a predetermined temperature and pressure, the pressure regulating valve control computation process 53a and temperature regulating valve control computation process 55a are performed as indicated by the control flowchart in FIG. 4. More specifically, the computing unit 61 of the control device 60 performs computations in accordance with the heavy oil pressure signal p1 and temperature signal t1, which are detected by the pressure gauge 95 and thermometer 94 installed in the piping 81 for introducing the heavy oil 1a into the reformer vessel 7, and the heavy oil pressure setting p1a and temperature setting t1a, which are set by the condition input unit 62. The computing unit 61 of the control device 60, as the result of the computations, outputs the valve opening instruction signal c6 to the heavy oil pressure regulating valve 53 installed in the piping 81, and outputs the valve opening instruction signal c1 to the heavy oil heater temperature regulating valve 55 installed in the piping 84, thereby adjusting the heavy oil 1a for a predetermined temperature (200 to 400° C.) and pressure (10 to 30 MPa).

Similarly, to adjust the pure water 3a, which is heated in the pure water heater 2 and placed in a high-temperature, high-pressure state, for a predetermined temperature and pressure, the pressure regulating valve control computation process 54a and temperature regulating valve control computation process 56a are performed as indicated by the control flowchart in FIG. 4. More specifically, the computing unit 61 of the control device 60 performs computations in accordance with the pure water pressure signal p2 and temperature signal t2, which are detected by the pressure gauge 98 and thermometer 97 installed in the piping 82 for introducing the pure water 3a into the reformer vessel 7, and the pure water pressure setting p2a and temperature setting t2a, which are set by the condition input unit 62. The computing unit 61 of the control device 60, as the result of the computations, outputs the valve opening instruction signal c7 to the pure water pressure regulating valve 54 installed in the piping 82, and outputs the valve opening instruction signal c2 to the pure water heater temperature regulating valve 56 installed in the piping 85, thereby adjusting the pure water 3a for a predetermined temperature (350 to 500° C.) and pressure (10 to 30 MPa).

Next, the heavy oil static dielectric constant $\in 1$ detected by the heavy oil measurement capacitance sensor 70 installed in the piping 81 for introducing the high-temperature, high-pressure heavy oil 1a, which is heated by the heavy oil heater 4, into the reformer vessel 7 and the actual pure water static dielectric constant $\in 2$ detected by the pure water measurement capacitance sensor 71 installed in the piping 82 for introducing the high-temperature, high-pressure pure water 3a, which is heated by the pure water heater 2, into the reformer vessel 7 are inputted into the computing unit 61 of the control device 60 as detection data.

The control method of the control device 60 in the predetermined pressure condition mode in which the pressure condition is maintained constant will now be described. The static dielectric constant $\in 1a$ of the heavy oil 1a, that prevails at a predetermined pressure setting selected for the heavy oil 1a, is set by the condition input unit 62. Similarly, the static dielectric constant $\in 2a$ of the pure water 3a, that prevails at a predetermined pressure setting selected for the pure water 3a, is set by the condition input unit 62.

The static dielectric constant setting $\in 1a$ for the heavy oil 1a is inputted into the computing unit 61 of the control device 60, and a computation process 60a is performed as indicated by the control flowchart in FIG. 4 to judge whether $\in 1 \approx \in 1a$. The computing unit 61 compares the actual heavy oil static dielectric constant $\in 1$, which is detected by the heavy oil measurement capacitance sensor 70, against the heavy oil static dielectric constant setting $\in 1a$, which is selected by the condition input unit 62, and exercises control to adjust the temperature of the heavy oil 1a by adjusting the opening of the heavy oil heater temperature regulating valve 55 in accordance with the valve opening instruction signal c1, which is calculated by the computing unit 61 to ensure that the actual static dielectric constant $\in 1$ agrees with static dielectric constant setting $\in 1a$.

Similarly, the static dielectric constant setting $\in 2a$ for the pure water 3a is inputted into the computing unit 61 of the control device 60, and a computation process 60b is performed as indicated by the control flowchart in FIG. 4 to judge whether $\in 2 \approx \in 2a$. The computing unit 61 compares the actual pure water static dielectric constant $\in 2$, which is detected by the pure water measurement capacitance sensor 71, against the pure water static dielectric constant setting $\in 2a$, which is selected by the condition input unit 62, and exercises control to adjust the temperature of the pure water 3a by adjusting the opening of the pure water heater temperature regulating valve 56 in accordance with the valve opening instruction signal c2, which is calculated by the computing unit 61 to ensure that the actual static dielectric constant $\in 2$ agrees with static dielectric constant setting $\in 2a$.

After completion of the computation process 60a, which is performed for heavy oil temperature adjustment by judging whether $\in 1 \approx \in 1a$, and the computation process 60b, which is performed for pure water temperature adjustment by judging whether $\in 2 \approx \in 2a$, a computation process 60c is performed as indicated by the control flowchart in FIG. 4 to compare the actual static dielectric constant ∈1 of the heavy oil 1a against the actual static dielectric constant ∈2 of the pure water 3a and judge whether ∈1≈∈2.

If the judgment result obtained in the computation process 60c, which is performed to judge whether ∈1≈∈2, indicates that the static dielectric constant ∈1 of the heavy oil 1a is nearly equal to the static dielectric constant ∈2 of the pure water 3a (∈1≈∈2), the flow proceeds to the process 52a for supplying the heavy oil and pure water to the reformer vessel. In accordance with the instructions from the computing unit 61 of the control device 60, the high-temperature, high-pressure heavy oil supply valve 52 and high-temperature, high-pressure water supply valve 51 are opened to supply the heavy oil 1a and pure water 3a to the reformer vessel 7, their actual static dielectric constants ∈1, ∈2 being nearly equal. The supplied heavy oil 1a and pure water 3a are then mixed in the reformer vessel 7 at a high temperature under high pressure to cause a hydrothermal reaction, reform the heavy oil 1a, and generate the reformed fuel 18a.

On the other hand, if the judgment result obtained in the computation process 60c, which is performed to judge whether ∈1≈∈2, indicates that the static dielectric constant ∈1 of the heavy oil 1a is still not equal to the static dielectric constant ∈2 of the pure water 3a (∈1≠∈2), control is exercised as is the case with the temperature regulating valve control process 56a for adjusting the temperature of the pure water 3a. More specifically, the computing unit controls the actual static dielectric constant ∈2 of the pure water 3a by adjusting the opening of the pure water heater temperature regulating valve 56 in accordance with the valve opening instruction signal c2 from the computing unit 61 to adjust the temperature of the high-temperature, high-pressure pure water 3a.

In a situation where the temperature needs to be readjusted because the static dielectric constant ∈1 is still not equal to the static dielectric constant ∈2, however, control may be exercised for temperature adjustment by adjusting the heavy oil heater temperature regulating valve 55 instead of the pure water heater temperature regulating valve 56 although such is not indicated in the flowchart.

After the reformed fuel 18a is generated by reforming the heavy oil 1a through a hydrothermal reaction between the heavy oil 1a and pure water 3a in the reformer vessel 7, the reformed fuel measurement capacitance sensor 72, which is included in the reformer vessel 7, detects the static dielectric constant ∈3 of the reformed fuel 18a and inputs the detected static dielectric constant ∈3 into the computing unit 61.

The computing unit 61 of the control device 60 performs a computation process 60d as indicated in the control flowchart in FIG. 4 to judge whether ∈3a≈∈3. More specifically, the computing unit 61 compares the actual static dielectric constant ∈3 of the reformed fuel 18a, which is detected by the reformed fuel measurement capacitance sensor 72, against the reformed fuel static dielectric constant ∈3a that is set by the condition input unit 62 as a quality limit value.

If the static dielectric constant ∈3 of the generated reformed fuel 18a is not greater than the quality limit static dielectric constant ∈3a (∈3a≧∈3), it is judged that the reformed fuel 18a is properly softened.

Next, a computation process 60e is performed as indicated by the control flowchart in FIG. 4 to judge whether ∈4a≧∈4. More specifically, the actual static dielectric constant ∈4 of the liquid reformed fuel 20a stored in the reformed oil tank 14, which is detected by a reformed fuel measurement capacitance sensor 74 installed in the reformed oil tank 14, is compared against the quality limit static dielectric constant ∈4a of the reformed fuel, which is set by the condition input unit 62.

If the static dielectric constant ∈4 of the liquid reformed fuel 20a is not greater than the quality limit static dielectric constant ∈4a (∈4a≧∈4), it is judged that the liquid reformed fuel 20a is properly softened. Therefore, the flow proceeds to a process 57a for supplying to a GT.

Since the judgment result obtained in the computation process 60d indicates that the static dielectric constant ∈3 of the reformed fuel 18a is not greater than the quality limit static dielectric constant ∈3a (∈3a≧∈3), the process 57a for supplying to the GT is performed to open a reformer vessel pressure regulating valve 57 installed in the piping 87, and supply the reformed fuel 18a, which is generated in the reformer vessel 7, from the reformer vessel 7 to the separator 12. Further, the reformed gas supply valve 41 installed in the piping 88 is opened to supply the reformed gas 19a, which has obtained from the reformed fuel 18a in the separator 12, to the combustor 24 in the gas turbine installation 200.

Meanwhile, the liquid reformed fuel 20a, which has also obtained from the reformed fuel 18a in the separator 12, is supplied to the reformed oil tank 14 through the piping 89 and stored.

Further, since the judgment result obtained in the computation process 60e indicates that the actual static dielectric constant ∈4 of the liquid reformed fuel 20a stored in the reformed oil tank 14 is not greater than the quality limit static dielectric constant ∈4a (∈4a≧∈4), the process 57a for supplying to the GT is performed to open the reformed oil supply valve 40 installed in the piping 89 and supply the liquid reformed fuel 20a to the combustor 24 in the gas turbine installation 200.

The liquid reformed fuel 20a and reformed gas 19a, which were obtained due to separation in the separator 12, are supplied to the combustor 24 in the gas turbine installation 200 through the pipings 89, 88 as described above, and burned as fuels to drive the gas turbine installation 200.

However, if the judgment result obtained in the computation process 60d, which is performed to judge whether ∈3a≧∈3, indicates that the actual static dielectric constant ∈3 of the reformed fuel 18a generated in the reformer vessel 7 is greater than the quality limit static dielectric constant ∈3a of the reformed fuel, the reformed fuel 18a is eliminated from the system without being supplied to the gas turbine installation 200 as a fuel because its quality is low.

Similarly, if the judgment result obtained in the computation process 60e, which is performed to judge whether ∈4a≧∈4, indicates that the actual static dielectric constant ∈4 of the liquid reformed fuel 20a generated in the separator 12 is greater than the quality limit static dielectric constant ∈4a of the reformed fuel, the liquid reformed fuel 20a is eliminated from the system without being supplied to the gas turbine installation 200 as a fuel because its quality is low.

As is obvious from the foregoing description, with the embodiment described above, it is possible to exercise operation control so as to establish optimum heavy oil reforming conditions (temperature and pressure) at the time of subjecting the heavy oil 1a to a hydrothermal reaction to generate the reformed fuel even when the heavy fuel 1a to be reformed has a different composition.

In the embodiment described above, the static dielectric constants of the heavy oil 1a and pure water 3a are detected by the heavy oil measurement capacitance sensor 70 and pure water measurement capacitance sensor 71. However, an alternative is to detect solubility, which correlates with a static dielectric constant, by using the heavy oil measurement conductivity sensor 91 and pure water measurement conductivity sensor 92, which detect conductivity that correlates with solubility, let the computing unit 61 of the control device 60 compute the instruction signals c1-c7 in accordance with values detected by the conductivity sensors, and control the openings of the supply valves and regulating valves in accordance with the instruction signals c1-c7.

The tar measurement capacitance sensor 73 installed in the tar detector 8, which is provided for the piping 83 for removing the tar 17a from the reformer vessel 7, measures the static dielectric constant $\in 5$ of the tar 17a, which is residual oil generated as a result of reformed fuel generation in the reformer vessel 7, and inputs the actual static dielectric constant $\in 5$ into the computing unit 61 of the control device 60.

The static dielectric constant $\in 5$ of the tar 17a is measured to let the computing unit 61 grasp the status of the tar 17a as the residual oil. The status of the tar 17a is then used as a criterion for judging whether a reforming process is properly performed in the reformer vessel 7.

With the embodiment described above, it is possible to exercise operation control to establish good reforming conditions (temperature and pressure) without regard to the difference in heavy oil composition even when a different heavy oil composition is encountered, and provide a reformed-fuel-burning gas turbine system that constantly generates good-quality reformed fuel.

The control method for the reformed-fuel-burning gas turbine system in the predetermined temperature condition mode in which the temperature condition is maintained constant will now be described. The reformed-fuel-burning gas turbine system in the predetermined temperature condition mode according to the present embodiment will not be described because it has the same configuration as the first embodiment shown in FIGS. 1 and 6.

The control method for the reformed-fuel-burning gas turbine system in the predetermined temperature condition mode will now be described with reference to FIG. 5.

The control method for the reformed-fuel-burning gas turbine system in the predetermined temperature condition mode is largely similar to the control method for the reformed-fuel-burning gas turbine system in the predetermined pressure condition mode shown in FIG. 4. Therefore, only the differences between the above two control methods will be described below.

Figure 5:
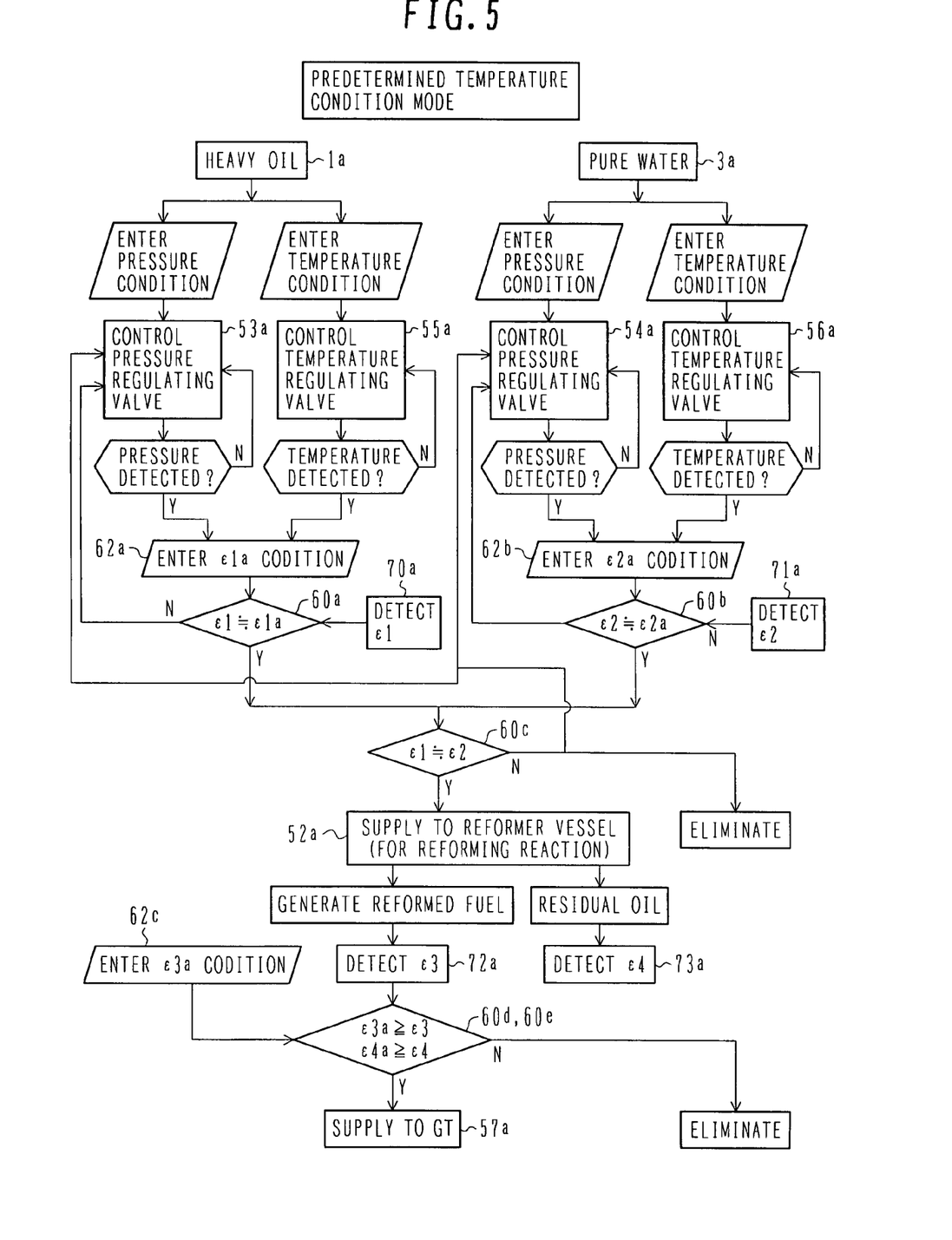
FIG. 5 is a control flowchart illustrating how the reformed-fuel-burning gas turbine system according to the embodiment shown in FIG. 1 exercises control in a predetermined temperature condition mode.

Referring to a control flowchart in FIG. 5, which illustrates how control is exercised in the predetermined temperature condition mode in which the temperature condition is maintained constant, the pressure regulating valve control computation process 53a and temperature regulating valve control computation process 55a, which adjust the heavy oil 1a for a predetermined pressure and temperature, and the pressure regulating valve control computation process 54a and temperature regulating valve control computation process 56a, which adjust the pure water 3a for a predetermined pressure and temperature, are the same as the counterparts in the predetermined pressure condition mode illustrated by the control flowchart in FIG. 4.

As regards the static dielectric constant of the heavy oil 1a, the computation process 60a is performed as indicated by the control flowchart in FIG. 5 to judge whether $\in 1 \approx \in 1a$. More specifically, the computing unit 61 compares the actual static dielectric constant $\in 1$ of the heavy oil 1a, which is detected by the heavy oil measurement capacitance sensor 70, against the static dielectric constant setting $\in 1a$ for the heavy oil 1a, which is selected by the condition input unit 62, and exercises control to adjust the pressure of the heavy oil 1a by adjusting the opening of the heavy oil pressure regulating valve 53 in accordance with the valve opening instruction signal c6, which is computed by the computing unit 61 to ensure that the actual static dielectric constant $\in 1$ agrees with the static dielectric constant setting a1a. The above is the difference from the predetermined pressure condition mode shown in FIG. 4 in which the temperature of the heavy oil 1a is controlled by adjusting the opening of the heavy oil heater temperature regulating valve 55.

As regards the static dielectric constant of the pure water 3a, the computation process 60b is performed as indicated by the control flowchart in FIG. 5 to judge whether $\in 2 \approx \in 2a$. More specifically, the computing unit 61 compares the actual static dielectric constant $\in 2$ of the pure water 3a, which is detected by the pure water measurement capacitance sensor 71, against the static dielectric constant setting $\in 2a$ for the pure water 3a, which is selected by the condition input unit 62, and exercises control to adjust the pressure of the pure water 3a by adjusting the opening of the pure water pressure regulating valve 54 in accordance with the valve opening instruction signal c7, which is computed by the computing unit 61 to ensure that the actual static dielectric constant $\in 2$ agrees with the static dielectric constant setting $\in 2a$. The above is the difference from the predetermined pressure condition mode shown in FIG. 4 in which the temperature of the pure water 3a is controlled by adjusting the opening of the pure water heater temperature regulating valve 56.

Further, the computation process 60c is performed as indicated by the control flowchart in FIG. 5 to judge whether the static dielectric constant of the heavy oil 1a is nearly equal to that of the pure water 3a ($\in 1 \approx \in 2$). If the obtained judgment result indicates that the static dielectric constant $\in 1$ of the heavy oil 1a is still different from the static dielectric constant $\in 2$ of the pure water 3a ($\in 1 \neq \in 2$), pressure control is exercised to fine tune the actual static dielectric constant $\in 2$ of the pure water 3a by controlling the opening of the pure water pressure regulating valve 54 in accordance with the valve opening instruction signal c7 from the computing unit 61 to adjust the pressure of the high-temperature, high-pressure pure water 3a. The above is the difference from the predetermined pressure condition mode shown in FIG. 4 in which the temperature of the pure water 3a is controlled by adjusting the opening of the pure water heater temperature regulating valve 56.

Meanwhile, pressure control is exercised to fine tune the actual static dielectric constant $\in 1$ of the heavy oil 1a by controlling the opening of the heavy oil pressure regulating valve 53 in accordance with the valve opening instruction signal c6 from the computing unit 61 to adjust the pressure of the high-temperature, high-pressure heavy oil 1a. The above is the difference from the predetermined pressure condition mode shown in FIG. 4 in which the temperature of the heavy oil 1a is controlled by adjusting the opening of the heavy oil heater temperature regulating valve 55.

Control exercised in the predetermined temperature condition mode shown in FIG. 5 is such that control operations performed in accordance with computations in the computation process 60d, which is performed to judge whether $\in 3a \geq \in 3$, and the computations in the computation process 60e, which is performed to judge whether $\in 4a \geq \in 4$, are the same as those in the predetermined pressure condition mode shown in FIG. 4.

With the embodiments of the present invention described above, it is possible to realize a reformed-fuel-burning gas turbine system and a method of operating the reformed-fuel-burning gas turbine system, which select reforming conditions appropriate for the composition of heavy oil and constantly generate good-quality reformed fuel even when the heavy oil to be reformed has a different composition and a high asphaltene content.

The present invention can be applied to a reformed-fuel-burning gas turbine system operating on reformed fuel that is obtained by subjecting heavy oil to a hydrothermal reaction, and to a method of operating the reformed-fuel-burning gas turbine system.

What is claimed is:

1. A reformed-fuel-burning gas turbine system comprising: a heavy oil heater for heating heavy oil under high pressure; a water heater for heating water under high pressure; a reformer vessel for mixing high-temperature, high-pressure water with high-temperature, high-pressure heavy oil to cause a hydrothermal reaction and producing reformed fuel from heavy oil; and a gas turbine which operates on the reformed fuel produced in said reformer vessel,
wherein said system further comprises:
a first detector for detecting the static dielectric constants or solubility of high-temperature, high-pressure heavy oil heated by said heavy oil heater and high-temperature, high-pressure water heated by said water heater;
a first temperature regulating valve provided in a line for supplying a heating medium to said heavy oil heater and used to adjust the thermal dose of said heavy oil heater;
a second temperature regulating valve provided in a line for supplying a heating medium to said water heater and used to adjust the thermal dose of said water heater; and
a control device for adjusting said first temperature regulating valve and said second temperature regulating valve in accordance with the static dielectric constants or solubility of the heavy oil and water, which are detected by said first detector, in order to control the static dielectric constants or solubility of the high-temperature, high-pressure heavy oil and high-temperature, high-pressure water, which are to be supplied to said reformer vessel.

2. A reformed-fuel-burning gas turbine system comprising: a heavy oil heater for heating heavy oil under high pressure; a water heater for heating water under high pressure; a reformer vessel for mixing high-temperature, high-pressure water with high-temperature, high-pressure heavy oil to cause a hydrothermal reaction and producing reformed fuel from heavy oil; and a gas turbine which operates on the reformed fuel produced in said reformer vessel;
wherein said system further comprises:
a first detector for detecting the static dielectric constants or solubility of high-temperature, high-pressure heavy oil heated by said heavy oil heater and high-temperature, high-pressure water heated by said water heater;
a first pressure regulating valve provided in a line for supplying heavy oil to said heavy oil heater and used to adjust the pressure of the heavy oil;
a second pressure regulating valve provided in a line for supplying water to said water heater and used to adjust the pressure of the water; and
a control device for adjusting said first pressure regulating valve and said second pressure regulating valve in accordance with the static dielectric constant or solubility of the heavy oil and water, which are detected by said first detector, in order to control the static dielectric constants or solubility of the high-temperature, high-pressure heavy oil and high-temperature, high-pressure water to be supplied to said reformer vessel.

3. The reformed-fuel-burning gas turbine system according to claim 1, further comprising:
a first pressure regulating valve included in a line for supplying heavy oil to said heavy oil heater and used to adjust the pressure of the heavy oil; and
a second pressure regulating valve that is included in a line for supplying water to said water heater and used to adjust the pressure of the water,
wherein said control device adjusts said first pressure regulating valve and said second pressure regulating valve in accordance with the static dielectric constants or solubility of the heavy oil and water, which are detected by said first detector, in order to control the static dielectric constants or solubility of the high-temperature, high-pressure heavy oil and high-temperature, high-pressure water, which are to be supplied to said reformer vessel.

4. The reformed-fuel-burning gas turbine system according to claim 1, wherein said control device ensures that the pressure of the water to be supplied to said water heater and the pressure of the heavy oil to be supplied to said heavy oil heater are maintained as specified, and adjusts said first temperature regulating valve and said second temperature regulating valve in accordance with the static dielectric constants or solubility of the heavy oil and water, which are detected by said first detector, in order to control the static dielectric constants or solubility of the high-temperature, high-pressure heavy oil and high-temperature, high-pressure water, which are to be supplied to said reformer vessel.

5. The reformed-fuel-burning gas turbine system according to claim 2, wherein said control device ensures that the temperature of the water to be supplied to said water heater and the temperature of the heavy oil to be supplied to said heavy oil heater are maintained as specified, and adjusts said first pressure regulating valve and said second pressure regulating valve in accordance with the static dielectric constants or solubility of the heavy oil and water, which are detected by said first detector, in order to control the static dielectric constants or solubility of the high-temperature, high-pressure heavy oil and high-temperature, high-pressure water, which are to be supplied to said reformer vessel.

6. The reformed-fuel-burning gas turbine system according to claim 1 or 2, further comprising:
a second detector for detecting the static dielectric constant or solubility of reformed fuel produced in said reformer vessel; and
a supply valve provided in a line for supplying reformed fuel from said reformer vessel to said gas turbine and used to adjust the supply quantity of the reformed fuel;
wherein said control device controls said supply valve in accordance with the static dielectric constant or solubility of the reformed fuel, which is detected by said second detector.

7. The reformed-fuel-burning gas turbine system according to claim 1 or 2, wherein said first detector is a capacitance sensor or a conductivity sensor.

8. The reformed-fuel-burning gas turbine system according to claim 6, wherein said second detector is a capacitance sensor or a conductivity sensor.

9. A method of operating a reformed-fuel-burning gas turbine system, the method comprising steps of: heating heavy oil under high pressure with a heavy oil heater; heating water under high pressure with a water heater; mixing high-temperature, high-pressure water with high-temperature, high-pressure heavy oil in a reformer vessel to cause a hydrothermal reaction and produce reformed fuel from heavy oil; and driving a gas turbine on the reformed fuel,
wherein the method further comprising the steps of:
detecting the static dielectric constants or solubility of high-temperature, high-pressure heavy oil heated by said heavy oil heater and high-temperature, high-pressure water heated by said water heater; and adjusting the opening of a first temperature regulating valve, which is provided in a line for supplying a heating medium to said heavy oil heater and used to adjust the thermal dose of said heavy oil heater, and the opening of a second temperature regulating valve, which is provided in a line for supplying a heating medium to said water heater and used to adjust the thermal dose of said water heater, in accordance with the detected static dielectric constants or solubility for the purpose of controlling the static dielectric constants or solubility of the high-temperature, high-pressure heavy oil and high-temperature, high-pressure water, which are to be supplied to said reformer vessel.

10. A method for operating a reformed-fuel-burning gas turbine system, the method comprising steps of: heating heavy oil under high pressure with a heavy oil heater; heating water under high pressure with a water heater; mixing high-temperature, high-pressure water with high-temperature, high-pressure heavy oil in a reformer vessel to cause a hydrothermal reaction and produce reformed fuel from heavy oil; and driving a gas turbine on the reformed fuel, wherein the method further comprising the steps of:

detecting the static dielectric constants or solubility of high-temperature, high-pressure heavy oil heated by said heavy oil heater and high-temperature, high-pressure water heated by said water heater; and adjusting the opening of a first pressure regulating valve, which is provided in a line for supplying heavy oil to said heavy oil heater and used to adjust the pressure of the heavy oil, and the opening of a second pressure regulating valve, which is provided in a line for supplying water to said water heater and used to adjust the pressure of the water, in accordance with the detected static dielectric constants or solubility for the purpose of controlling the static dielectric constants or solubility of the high-temperature, high-pressure heavy oil and high-temperature, high-pressure water, which are to be supplied to said reformer vessel.

11. The method according to claim 8 or 9, further comprising the steps of:

detecting the static dielectric constant or solubility of reformed fuel produced in said reformer vessel; and adjusting the opening of a supply valve, which is provided in a line for supplying reformed fuel from said reformer vessel to said gas turbine and used to adjust the supply quantity of the reformed fuel, in accordance with the detected static dielectric constant or solubility of the reformed fuel for the purpose of controlling the reformed fuel to be supplied from said reformer vessel to said gas turbine.

12. The reformed-fuel-burning gas turbine system according to claim 2, further comprising:

a second detector for detecting the static dielectric constant or solubility of reformed fuel produced in said reformer vessel; and a supply valve provided in a line for supplying reformed fuel from said reformer vessel to said gas turbine and used to adjust the supply quantity of the reformed fuel, wherein said control device controls said supply valve in accordance with the static dielectric constant or solubility of the reformed fuel, which is detected by said second detector.

13. The reformed-fuel-burning gas turbine system according to claim 2, wherein said first detector is a capacitance sensor or a conductivity sensor.

14. The method according to claim 9, further comprising the steps of:

detecting the static dielectric constant or solubility of reformed fuel produced in said reformer vessel; and adjusting the opening of a supply valve, which is provided in a line for supplying reformed fuel from said reformer vessel to said gas turbine and used to adjust the supply quantity of the reformed fuel, in accordance with the detected static dielectric constant or solubility of the reformed fuel for the purpose of controlling the reformed fuel to be supplied from said reformer vessel to said gas turbine.

\* \* \* \* \*